(12) United States Patent
Banks, III

(10) Patent No.: US 11,193,441 B1
(45) Date of Patent: Dec. 7, 2021

(54) INTAKE ADAPTION SYSTEM

(71) Applicant: Gale C. Banks, III, Bradbury, CA (US)

(72) Inventor: Gale C. Banks, III, Bradbury, CA (US)

(*) Notice: Subject to any disclaimer, the term of this patent is extended or adjusted under 35 U.S.C. 154(b) by 0 days.

(21) Appl. No.: 17/321,427

(22) Filed: May 15, 2021

(51) Int. Cl.
| F02D 41/18 | (2006.01) |
| F02D 41/00 | (2006.01) |
| F02D 19/00 | (2006.01) |
| F02D 21/00 | (2006.01) |
| F02D 1/06 | (2006.01) |
| F02M 35/10 | (2006.01) |
| F02M 35/024 | (2006.01) |
| B60R 16/023 | (2006.01) |

(52) U.S. Cl.
CPC .............. *F02D 41/18* (2013.01); *F02D 1/065* (2013.01); *F02D 19/00* (2013.01); *F02D 21/00* (2013.01); *F02D 41/0052* (2013.01); *F02M 35/024* (2013.01); *F02M 35/10373* (2013.01); *B60R 16/0231* (2013.01)

(58) Field of Classification Search
CPC .......... F02D 1/065; F02D 9/08; F02D 11/105; F02D 19/00; F02D 21/00; F02D 41/0002; F02D 41/0052; F02D 41/18; F02D 41/2412; F02M 35/024; F02M 35/10144; F02M 35/10249; F02M 35/10373; F02M 35/0204; B60R 16/0207; B60R 16/0231
USPC ............................. 123/184.21–184.61, 198 E
See application file for complete search history.

(56) References Cited

U.S. PATENT DOCUMENTS

| 6,863,044 B2* | 3/2005 | Nakamura ........... F02M 35/024 123/198 E |
| 9,062,639 B1* | 6/2015 | Mackenzie ............ B62D 25/18 |
| 10,125,729 B1* | 11/2018 | Mashburn ........ F02M 35/10144 |
| 10,465,640 B1* | 11/2019 | Wolgamott ........... F02D 41/182 |
| 2012/0312270 A1* | 12/2012 | Kaiser ..................... G01F 1/684 123/184.21 |
| 2016/0138507 A1* | 5/2016 | Klassen .............. F02D 41/0002 123/198 E |
| 2020/0049082 A1* | 2/2020 | Hjelm .................... B60K 13/02 |
| 2021/0025343 A1* | 1/2021 | Fiello .................. B60R 16/0207 |

\* cited by examiner

*Primary Examiner* — John Kwon
*Assistant Examiner* — Johnny H Hoang

(57) ABSTRACT

An intake adaption system for internal combustion engines of vehicles employing an aftermarket intake air assembly including high capacity intake ducting and a low resistance air filter. Intake air sensors provide intake air condition signals of filtered intake air to the engine. A CPU includes a routine for modifying the intake air condition signals of the filtered intake air to the ECM. Tables alter the appropriate sensor signal or signals to correct for the calibration and predictions made by the ECM based on the original equipment. A first table translates the intake air condition signals from the intake air sensors indicative of MAF into the engine to provide actual MAF into the engine. A second table generates a pressure offset responsive to MAF into the engine to provide the ECM with a lower pressure value than actual, avoiding a diagnostic trouble code.

7 Claims, 2 Drawing Sheets

INTAKE ADAPTION SYSTEM

BACKGROUND OF THE INVENTION

The field of the present invention is aftermarket air intake systems for vehicle engines.

Since the advent of the engine control module (ECM) for vehicles, electronic monitoring and control of engine performance has continually increased. Current systems control such functions as engine timing, fuel delivery, exhaust gas recirculation and supercharging boost. Monitoring can include both overall engine performance and component performance through comparisons of sensor data with expected values.

A large aftermarket industry has built up to provide performance options not available from the original equipment manufacturers of vehicles. The increased monitoring and control by current engine control modules (ECM) have created impediments to such aftermarket upgrades. One example of these difficulties is experienced in the area of advanced intake systems. Aftermarket intake systems include air intake system ducting with increased flow capacity and air filters with reduced airflow resistance. By reducing pressure loss, air density is increased; and larger throat diameters can reduce airspeed relative to mass airflow. Such systems can boost both power and efficiency. However, they change the sensed and monitored conditions in the intake system.

Intake ducting with increased flow capacity will provide lower pressure losses and increased mass airflow as will an air filter with reduced resistance. The sensed mass airflow and pressure signals received by the ECM, although accurately reflective of the conditions sensed, are no longer correctly interpreted by the ECM. This results in an improper tuning of the engine and the triggering of diagnostic trouble codes. For example, with a misinterpretation of mass airflow, improper air-fuel ratios can be set by the ECM. With reduced pressure loss over that predicted by the ECM, a diagnostic trouble code may be triggered to inappropriately indicate a damaged or missing air filter.

Aftermarket designers have typically created a design and then amended the design through empirical testing until the engine runs to their liking and the diagnostic trouble codes are not triggered. This method introduces the constraints of the ECM to the design. Such constraints, not pertinent to maximum flow efficiency, detract from the effectiveness of the original design.

SUMMARY OF THE INVENTION

The present invention is directed to an intake adaption system for internal combustion engines of vehicles employing an aftermarket intake air assembly amending intake performance. The aftermarket assembly may include high capacity intake ducting, a low resistance air filter or both. Intake air sensors provide intake air condition signals of filtered intake air to the engine. A central processing unit (CPU) is electronically located between the intake air condition signals of the intake air sensors and the vehicle ECM tuned to receive intake air condition signals from the original equipment air intake assembly. The CPU includes a routine for modifying the intake air condition signals of the filtered intake air to the ECM for normal operation of the ECM.

To accomplish the foregoing, the CPU receives filtered intake air condition signals from the intake air sensors indicative of mass airflow into the engine. One or more tables alters the appropriate sensor signal or signals to correct for the calibration and predictions made by the ECM based on the original equipment. To compensate for high capacity intake ducting greater than original equipment, a table translates the intake air condition signals from the intake air sensors indicative of mass airflow into the engine to provide actual mass airflow values into the engine. To compensate for an air filter with reduced airflow resistance over original equipment, a table generates a pressure offset to be added to the sensor signal, responsive to mass airflow into the engine to provide the ECM with a higher pressure value than actual, avoiding a diagnostic trouble code. If both a low airflow resistance filter and high capacity intake ducting are employed, the offset table receives signals of actual mass airflow from the translation table for generating a pressure offset.

Accordingly, it is a principal object of the present invention to provide a means to employ enhanced intake flow systems with original equipment ECMs without compromising the designs of the enhanced intake flow systems. Other and further objects and advantages will appear hereinafter.

DETAILED DESCRIPTION OF THE PREFERRED EMBODIMENT

Figure 1:
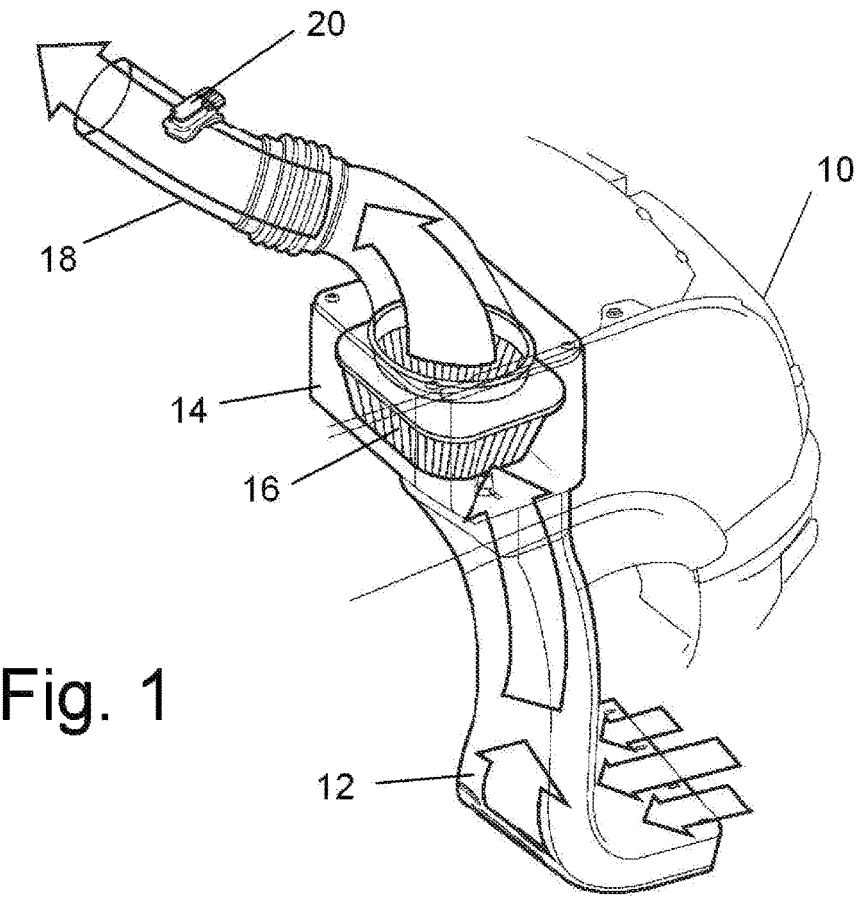
FIG. 1 is an illustrative isometric view of an intake system.

Current automotive internal combustion engine intake air filtration systems utilize sensors to measure filtered intake air conditions. These sensors are usually mounted in the airflow path between the filter and the engine's air inlet location. The sensors can be in a module or individually placed. A combination of sensors used to measure filtered intake air generally include temperature, pressure, humidity, and mass airflow (MAF). These measurements are supplied in real time to the engine control module (ECM) during engine operation. This information serves to inform the ECM's calculation of engine tuning performance and emissions parameters such as fuel amount, ignition and/or injection timing, manifold air pressure, exhaust gas recirculation, etc. Further, these sensed values serve to inform the ECM and, when necessary, the vehicle operator as to air filter condition and the presence of any unfiltered air leakage into the system. Each sensor produces a specific voltage, current, frequency or digital signal that is proportionate to the instantaneous value of its measured parameter. This proportionate output of voltage, current, frequency, or digital signal is referred to as the sensor's transfer function.

Mass airflow (MAF) sensors contain a sensing element which is usually a hot wire or hot film design. Air passing over or through the sensor cools the element; the current required to maintain the element's pre-set temperature is directly proportional to the density and velocity through a given orifice or cross-section of the airflow. These sensors compensate for air temperature which directly affects the cooling of the sensing element and consequently affects the air density directly impacting the rate of heat transfer. MAF sensors are used, among others, for maintaining engine tune, particularly the air/fuel ratio. Pressure sensor signals are used, among others, to determine the integrity of the filtration system's enclosures and ducting and the condition of the air filter element.

High-performance aftermarket engine air intake and filtration systems, designed for automotive or marine use, increase the intake air density when compared to original equipment systems. Increasing air density serves to increase maximum power at all engine speeds, as well as increasing fuel economy under all comparable, fixed throttle cruise conditions. These air density improvements are realized by reducing the loss in ambient pressure delivered to the engine caused by the original equipment engine air intake system ducting, air filter housing, and air filter design. This results in a higher pressure at the air intake system outlet which feeds the intake manifold or supercharging/air compressing device. Additionally, it is possible to reduce heat transfer from the engine bay to the air flowing through the system. This will reduce the air temperature when compared to the original equipment system such that an additional intake air density improvement will be realized at the air intake system outlet. These improvements serve to reduce the pressure losses, reduce the air temperature increases and improve the air density delivered to the engine when compared to the original equipment system.

Further, on naturally aspirated engines, the improved system reduces the parasitic crankshaft horsepower required to induct a given combustion air density into the cylinders of the engine. On supercharged engines, parasitic drive system horsepower is reduced; and, on turbocharged engines, required turbine drive pressure is reduced, reducing exhaust pumping losses and the parasitic horsepower required.

However, high-performance aftermarket engine air intake and filtration systems tend to skew the sensor transfer functions directed to an ECM tuned to an original equipment system. An effective aftermarket system will increase duct cross-sections, improve airflow into and out of a larger, low-pressure drop, filter, and decrease air temperature gains. Those changes change the air velocity and pressure drop rendering the original equipment sensor transfer functions inaccurate or outside the range of diagnostic thresholds. This results in improper air-fuel ratios and other tuning functions regulated by the ECM. In addition to engine tuning, these measurements are used to inform the engine's diagnostic system of any impending or outright failures of the original equipment air intake and filtration system components. An example would be a filtered air pressure reading above normal with the engine running. This would normally indicate a system admitting unfiltered ambient air through a leak occurring in or after the filter.

The present intake adaption system addresses the transfer function mismatch between the actual filtered intake air conditions in high-performance aftermarket systems and the vehicle ECM tuned to an original equipment system. The actual intake air condition signals are modified to provide transfer functions reestablishing a correct response from the ECM. In this way, the ECM can provide correct tuning responses to actual intake conditions. The intake adaption system further can provide intake condition signal offsets to correlate the operational differences of a high-performance system with the engine intake air conditions predicted by the ECM. By providing offsets, the ECM receives signals in predicted ranges that will not trigger diagnostic trouble codes.

FIG. 1 illustrates a representative aftermarket engine air intake and filtration assembly employable with the intake adaption system in a vehicle 10. The air intake ducting defines a high capacity intake passage that includes an air inlet duct 12 which directs ambient air to a filter housing 14. A filter 16 is arranged in the housing 14 to require all air to pass through the filter media from the inlet duct 12. An outlet duct 18 directs the filtered intake air from the filter 16 to a vehicle engine. A sensor module 20 is mounted on the outlet duct 18 to measure filtered intake air conditions through air intake system ducting. The outlet duct 18 does not require any features to precondition the filtered intake air passing the sensor module 20.

Figure 2:
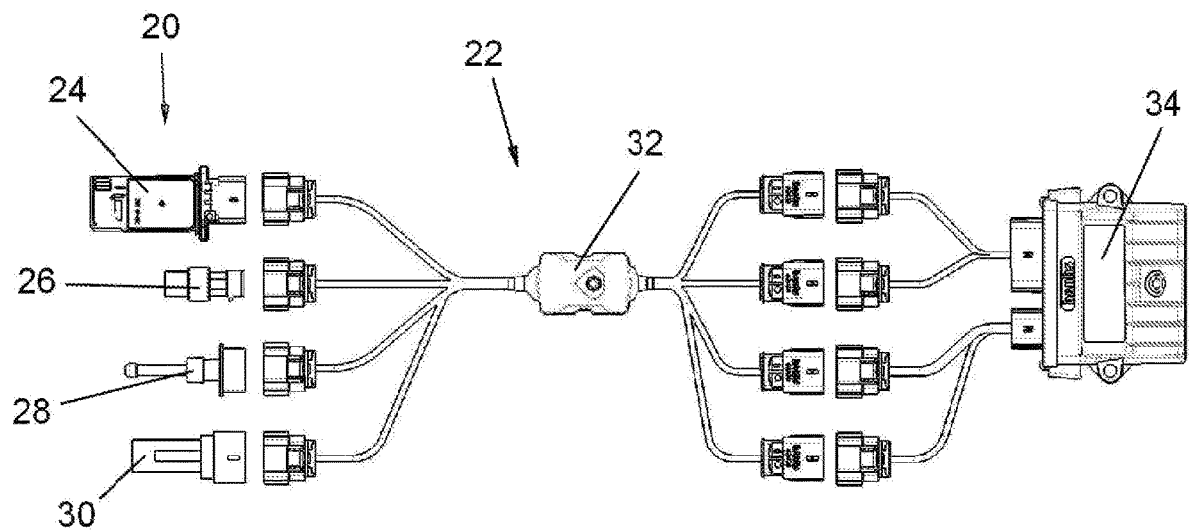
FIG. 2 is a layout of the elements of an intake adaption system.

FIG. 2 illustrates the electronic components of an intake adaption system 22. The sensor module 20 is shown to include an intake air MAF sensor 24, an intake air pressure sensor 26, an intake air temperature sensor 28 and a relative humidity sensor 30. In many applications, a humidity sensor is replaced by an assumed average humidity without humidity being sensed. A signal correction module 32 is coupled with the sensor module 20 to receive intake air condition signals from the sensors. The signal correction module 32 is also coupled with an original equipment vehicle ECM 34 tuned to receive intake air condition signals from the original equipment air intake assembly during engine operation, thereby locating the signal correction module electrically between the intake filtered air condition signals and the ECM 34 of the vehicle.

Figure 3:
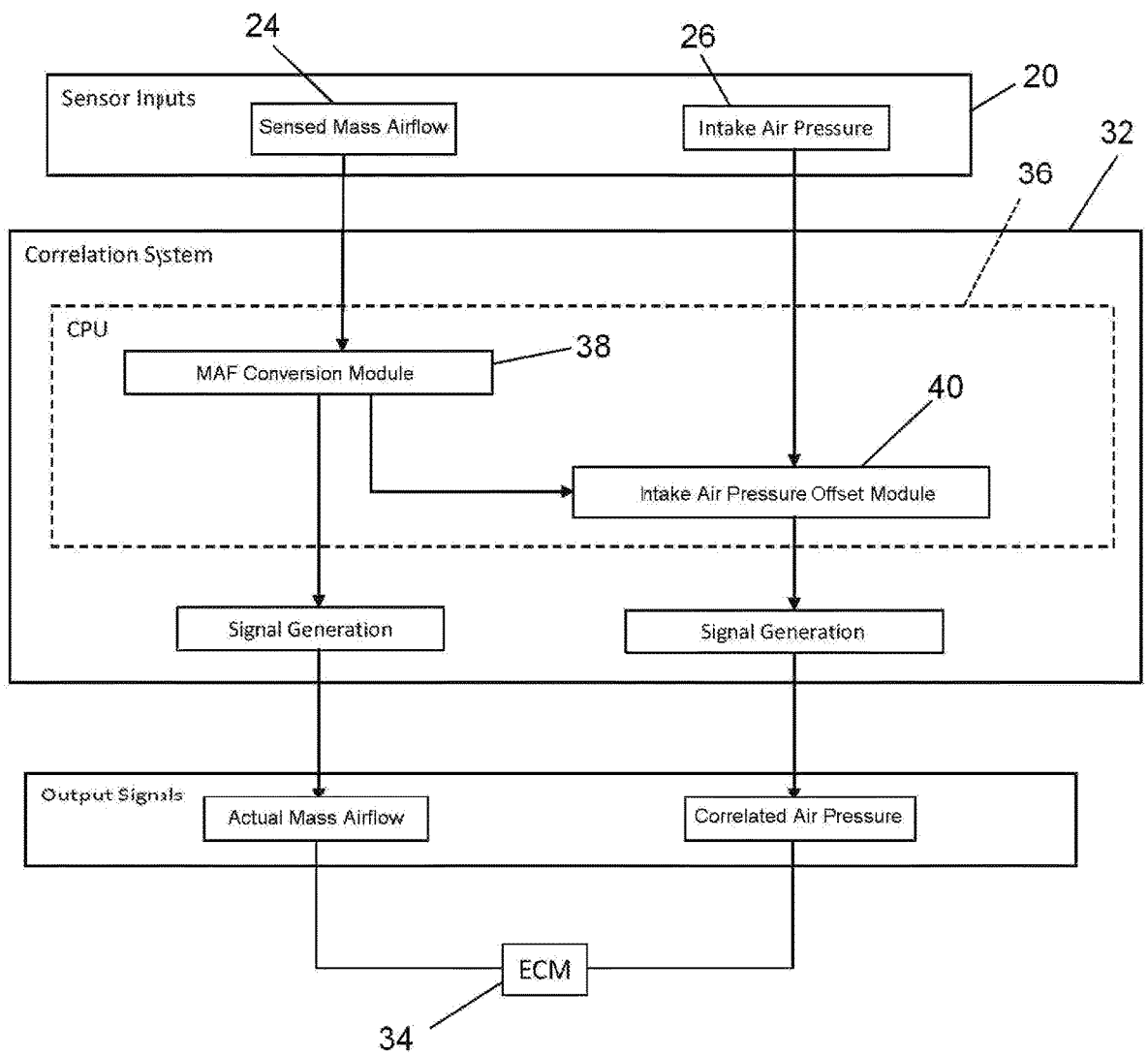
FIG. 3 is a logic diagram of an intake adaption system.

FIG. 3 illustrates the logic diagram of the intake adaption system defined within the signal correction module 32. The adaption system includes a CPU 36 electrically coupled with the intake air condition signals of the sensor module 20. In this embodiment, the CPU 36 is shown coupled with the MAF sensor 24 and the intake air pressure sensor 26. The intake air temperature sensor 28 and the relative humidity sensor 30 may simply pass through or around the CPU 36. Functions may also be applied to them as well. The CPU 36 may be defined as having a MAF conversion module 38 as part of the routine modifying the filtered intake air condition signals.

The conversion module 38 translates the incoming MAF signal from the sensor 24 using a signal conversion table. The converted MAF signals are then generated and sent to the vehicle ECM 34. This table is generated empirically by matching the ECM of each engine type with a specific high-performance air intake system ducting or filter and testing it over the full range of engine operation and in varying air temperature, altitude and other conditions.

First, the original equipment air intake and filtration system is tested. The original equipment air intake and filtration system is taken through its entire operating range in order to benchmark the original equipment sensor signals versus air pressure, temperature, relative humidity, air density and mass flow while the original equipment system is mounted and operating on the vehicle as well as removed from the vehicle and mounted on an airflow test bench. On the airflow test bench, volumetric flow is converted to mass airflow (MAF). The ambient, pre-filter and post-filter engine air inlet temperatures, pressures, and relative humidity versus MAF at each test point are recorded.

The high-performance replacement engine air intake and filtration system is then positioned on the same airflow test bench with the original equipment sensors fitted. The full range of volumetric flow test points used on the original equipment system test are then run. The difference in reported parameters at the same volumetric and/or MAF points are recorded. The increases in mass flow, increases in pressure, decreases in temperature, and increases in post system air density beyond what was found on the baseline test of the original equipment system are noted. The differences in reported values are then mapped in order to instruct the sensor signal conversion module. Differences may not be linear for any given sensor; hence these signal corrections require mapping versus a single offset calculation for each sensor.

The CPU 36 may also be defined as having an intake air pressure offset module 40 as part of the routine modifying the filtered intake air condition signals. A offset is employed to modify the actual pressure signal to one predicted by the ECM 34 based on the original equipment. These predictions are based on ranges of normal operation of the original equipment. As the high-performance intake air ducting and/or filter allow higher pressure in the intake, such systems operate normally outside the range of the original equipment and can offset diagnostic trouble codes. The offset amends the pressure signal to that expected of the original equipment to prevent triggering of a diagnostic trouble code during operation. The offset module 40 receives the translated MAF signal from the MAF conversion module 38 to create a offset pressure value. This offset value is added to the intake air pressure signal from the intake air pressure sensor 26, also delivered to the intake air pressure offset module 40. The offset is irregularly dependent on the converted MAF signal and also uses a table empirically developed.

During in-vehicle development, the minimum and maximum values over all engine loading conditions are monitored in the original equipment system. This data is used to establish the normal operating range of the intake sensors. The original equipment system data are compared to the high-performance intake data to create a offset table; and the signal from the offset module using the offset table amends the pressure signal to ensure the amended signal remains within expected normal original equipment operating range. This eliminates diagnostic trouble codes that can occur when installing a high-performance intake without any offset module.

The usual design element of increasing the cross-section of the intake tube at the MAF sensor location in and of itself will likely trigger DTC's on most modern vehicles due to changes in the fluid dynamics and subsequent sensor values. In response, the current state-of-the-art intake design attempts to replicate the fluid dynamics of the original equipment intake system by matching the cross-sectional area at the MAF sensor location using similar cross-sectional sizing, and flow-straightening before and after the sensor. This necessity virtually eliminates the effect of all other improvements rendering the entire system moot and providing no noticeable power or mileage improvement over the original equipment system. Having full control over the signal outputs from the intake sensors therefore allows for increased freedom of intake air system design.

During In-Vehicle development, the minimum and maximum values over all engine loading conditions are monitored in the original equipment system. This data is used to establish the normal operating range of the intake sensor. The original equipment system data are compared to the high-performance intake data, and the engine air intake and filtration system sensor signal correction module will amend the signals to ensure they remain accurate and within their expected normal operating range. This eliminates diagnostic trouble codes that can occur when installing a high-performance intake without any correction module.

Values such as, but not limited to, mass airflow, pressure, temperature, and relative humidity are measured within the intake system. Assuming the values fall within the preset limits of the calibration tables, the ECM will take the values and indicate to the engine the attributes of the entering air.

Thus, an engine adaption system has been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An intake adaption system for internal combustion engines of vehicles comprising
   intake air sensors producing filtered intake air condition signals;
   a first air intake assembly having first intake ducting and a first air filter;
   a vehicle ECM tuned to interpret the intake air condition signals from a second air intake assembly having greater air flow resistance than the first air intake assembly during engine operation and having second intake ducting and a second intake filter, the ECM to predict engine intake air condition signals and to compare the intake air condition signals with the predicted intake air condition signals;
   a CPU electronically located between the intake air sensors and the vehicle ECM, the CPU configured to modify at least some of the intake air condition signals of the filtered intake air from the intake air sensors to the ECM including a signal conversion table translating at least one of the intake air condition signals for the ECM to interpret actual intake air conditions through the first air intake assembly and a signal offset table offsetting at least one other of the intake air condition signals through the first air intake assembly to correlate the at least one other of the intake air condition signals through the first air intake assembly with ECM predicted engine intake air conditions.

2. The intake adaption system of claim 1, the at least one intake air condition signals being mass air flow and the at least one other intake air condition signals being air pressure.

3. The intake adaption system of claim 2, the intake air condition signals further including temperature and humidity.

4. An intake adaption system for internal combustion engines of vehicles comprising
   intake air sensors producing filtered intake air condition signals;
   a first air intake assembly having first intake ducting and a first air filter;
   a vehicle ECM tuned to interpret the intake air condition signals from a second air intake assembly having greater air flow resistance than the first air intake assembly during engine operation and having second intake ducting and a second intake filter, the ECM to predict engine intake air condition signals and to compare the intake air condition signals with the predicted intake air condition signals;
   a CPU electronically located between the intake air sensors and the vehicle ECM, the CPU configured to modify at least some of the intake air condition signals of the filtered intake air from the intake air sensors to the ECM including a signal conversion table translating at least one of the intake air condition signals for the ECM to interpret actual intake air conditions through the first air intake assembly and a signal offset table offsetting at least one other of the intake air condition signals through the first air intake assembly to correlate the at least one other of the intake air condition signals through the first air intake assembly with ECM predicted engine intake air conditions, the signal offset table receiving the translated intake air condition signals and sending the at least one other of the intake air condition signals to the ECM as a function of the translated at least one of the intake air condition signals.

5. An intake adaption system for internal combustion engines of vehicles comprising
intake air sensors producing filtered intake air condition signals including mass airflow and pressure signals;
a first air intake assembly having first intake ducting and a first air filter;
a vehicle ECM tuned to interpret the mass airflow signal from a second air intake assembly having greater air flow resistance than the first air intake assembly during engine operation and having second intake ducting and a second intake filter, the ECM to predict engine pressure signal and to compare the intake air condition pressure signals with the predicted intake air condition pressure signals;
a CPU electronically located between the intake air sensors and the vehicle ECM, the CPU configured to modify the intake air condition signals of the filtered intake air from the intake air sensors to the ECM including a signal conversion table translating the mass airflow signal for the ECM to interpret actual intake air conditions through the first air intake assembly and a signal offset table offsetting the pressure signal as a function of the translated mass airflow signal through the first air intake assembly to correlate the pressure signal through the first air intake assembly with the ECM predicted engine intake air conditions.

6. An intake adaption system for internal combustion engines of vehicles comprising
intake air sensors producing filtered intake air condition signals;
a first air intake assembly having a first air intake assembly first air filter;
a vehicle ECM tuned to interpret the intake air condition signals from a second air intake assembly having greater air flow resistance than the first air intake assembly during engine operation and having a second air intake assembly intake filter, the ECM to predict engine intake air condition signals and to compare the intake air condition signals with the predicted intake air condition signals;
a CPU electronically located between the intake air sensors and the vehicle ECM, the CPU configured to modify at least one of the intake air condition signals of the filtered intake air from the intake air sensors including a signal offset table offsetting one of the intake air condition signals as a function of one other of the intake air condition signals to correlate the intake air condition signal through the first air intake assembly with ECM predicted engine intake air conditions.

7. The intake adaption system of claim 6, the at least one intake air condition signals being mass air flow and the at least one other intake air condition signals being air pressure.

* * * * *